Nov. 10, 1959     L. MAKOUS     2,912,644
RESISTANCE AND TEMPERATURE DETERMINATIONS OF A MOTOR WINDING
Filed Nov. 3, 1954
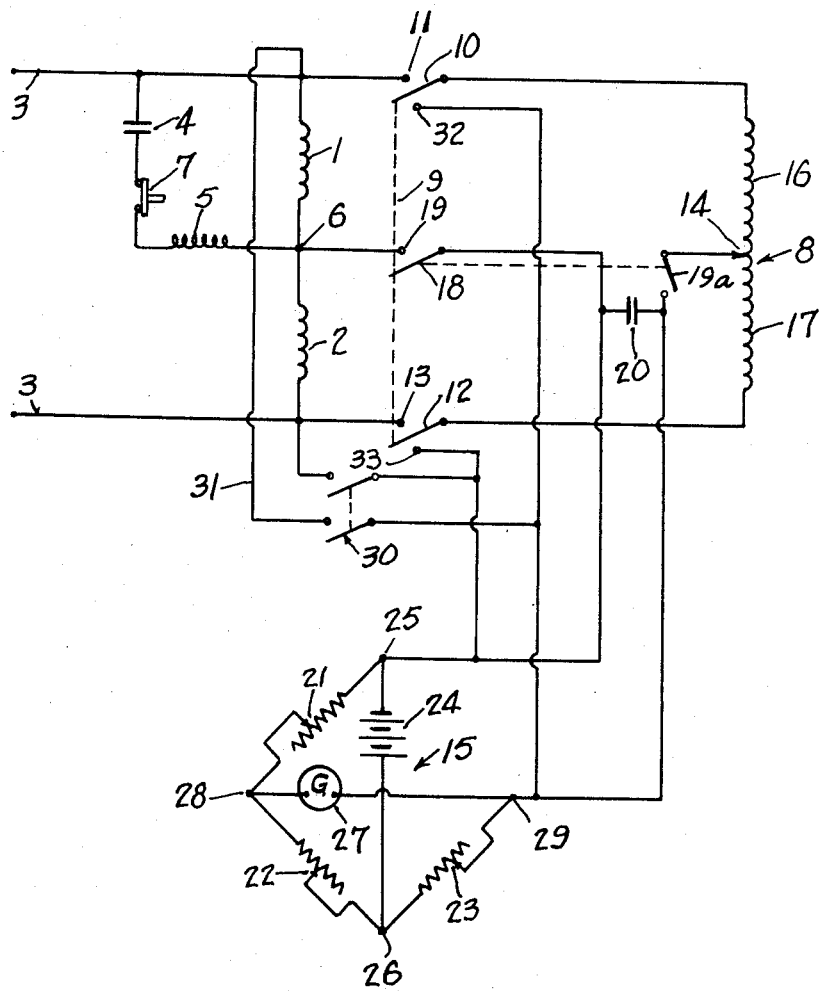
INVENTOR.
Lawrence Makous
BY
ATTORNEYS.

United States Patent Office
2,912,644
Patented Nov. 10, 1959

2,912,644

RESISTANCE AND TEMPERATURE DETERMINATIONS OF A MOTOR WINDING

Lawrence Makous, Wauwatosa, Wis., assignor to A. O. Smith Corporation, Milwaukee, Wis., a corporation of New York Application November 3, 1954, Serial No. 466,590

3 Claims. (Cl. 324—62)

This invention relates to apparatus for determining the resistance and temperature of a motor field winding while the motor is in operation.

In rating and testing dynamoelectric machines, it is often necessary to know the temperature of the stator winding under specified operating conditions. To obtain the required temperature readings with presently known methods, the operation of the machine is discontinued, a Wheatstone bridge is placed across the windings and the resistance of the windings is determined. Knowing the initial resistance and temperature and the final resistance, the final temperature is calculated from a well-known equation. This method is not entirely satisfactory because the rate of cooling of the motor windings is maximum immediately subsequent to the discontinuance of motor operation. The resistance changes with the temperature and therefore the results obtained are not as accurate as desired. The problem of cooling is particularly serious with water cooled motors which have a high rate of cooling.

Further, in various continuous tests, the resistance of the winding is desired without disrupting motor operations. Heretofore, the desired readings could not be obtained without disrupting motor operations. In accordance with the present invention, the resistance reading is taken while the motor is in operation. A balancing winding is connected across the stator winding and a Wheatstone bridge reading of the resistance between equipotential points of the stator winding and the balancing winding are obtained. Under this procedure, no alternating current flows in the bridge circuit and a true direct current resistance reading is obtained. Where the final temperature of the winding is desired, it is calculated from a standard conversion formula.

An object of the invention is to provide an inexpensive and accurate apparatus for determining the resistance and temperature of a motor winding under actual operating conditions.

The drawing furnished herewith illustrates the best mode presently contemplated for carrying out the invention as set forth hereinafter.

The drawing is a schematic diagram of an embodiment of the invention.

The stator winding of an induction motor, not shown, is illustrated as a dual voltage winding comprising two balanced windings 1 and 2. The windings 1 and 2 are connected in series across a source of power, not shown, by power leads 3. The stator winding is shown as a dual voltage winding because the application of this invention requires access to an intermediate point of the stator winding, as set forth hereinafter.

To start the motor, a conventional series connected condenser 4 and starting winding 5 is connected from one of the power leads 3 to the junction 6 of the windings 1 and 2. The condenser 4 provides a phase shift of the current in the starting winding with respect to the main winding and effects a starting of the motor in the usual manner. A set of normally closed contacts 7 are connected in the starting winding circuit and operate to disconnect the starting winding at a predetermined period after the initial energization of the motor. The contacts 7 are opened in any conventional manner such as by a centrifugal actuator, not shown, carried by the motor shaft, not shown.

The above described motor is a conventional single phase induction motor having a separate starting winding. As this variety of motor is well known, no further showing or description of the motor is deemed necessary.

In carrying out the invention the known relationship between a change of the resistance of a conductor with a change in the temperature of the conductor is employed to determine the final motor winding temperature. The equation of the relationship between resistances and temperature is as follows:

$$T_2 = \frac{R_2}{R_1}(K + t_1) - K$$

where:

$T_2$ = the final temperature
$R_2$ = the final resistance
$t_1$ = the initial temperature
$R_1$ = the initial resistance
$K$ = reciprocal of the coefficient of resistance, dependent on the conductor material A circuit for determining the resistance and temperature of the windings 1 and 2 while the motor is in operation, based on the above relationship, is described as follows:

A point of voltage equal to the voltage of the junction 6 which joins windings 1 and 2 is provided by an autotransformer 8 connected in parallel circuit with the windings 1 and 2 by a double throw, triple pole switch 9.

A first blade 10 of the switch 9 is connected to one terminal of the autotransformer 8, and an associated contact 11 is connected to the line terminal of winding 1. A second blade 12 of the switch 9 is connected to the opposite terminal of the autotransformer 8 and an associated contact 13 is connected to the line terminal of winding 2. The closing of blades 10 and 12 with the associated contacts 11 and 13, respectively, connects the autotransformer 8 in parallel with the series connected windings 1 and 2 across the power lines 3. Therefore, as the same voltage is applied across each parallel branch, a center tap 14 of the autotransformer 8 is adjusted to divide the autotransformer in the same ratio as the windings 1 and 2 and thereby set the tap 14 at the same potential as junction 6 of windings 1 and 2. As previously noted, it is assumed for purposes of illustration that windings 1 and 2 are identical and therefore the tap 14 is set midway between the terminals of the autotransformer.

With the junction 6 and tap 14 at the same potential, preventing the flow of alternating current, a Wheatstone resistance bridge circuit 15 is connected across the junction 6 and tap 14 and measures the series resistance of winding 1 and winding 16 in parallel with the series resistance of winding 2 and winding 17. The windings 16 and 17 are the two portions of the autotransformer lying on opposite sides of the tap 14 and are balanced with windings 1 and 2, respectively. The connection of the bridge circuit 15 is controlled by a third blade 18 of the triple pole switch 9 and an associated contact 19 which are connected in series with the above described parallel connected resistances and also a switch 19a which is connected in the lead of tap 14 and coupled to the triple pole switch 9 for simultaneous operation therewith.

A condenser 20 is provided across the unknown resistance to bypass any alternating current from the bridge circuit proper which may arise from slight unbalance of junctions 6 and tap 14.

The Wheatstone bridge circuit is of a conventional variety having a closed loop of four serially connected legs, three being known graduated variable resistors 21, 22 and 23 and the fourth being the unknown resistance to be measured as set forth above. A battery 24 is connected across diametrically opposite junctions 25 and 26 of the four legs to provide a circulating direct current and a galvanometer 27 or other current detecting device is connected across the adjacent diametrically opposite junctions 28 and 29. By suitable adjustment of the known variable resistances, the potential of junctions 28 and 29 is made equal, as noted by zero deflection of the galvanometer 27. Then the total unknown resistance is calculated from the three known resistance settings.

The resistance of the motor windings with the motor stopped is determined by connecting the windings 1 and 2 as the unknown resistance in the bridge circuit. A double pole switch 30 is inserted in a pair of leads 31 which connect the windings 1 and 2 as the unknown resistance. The temperature of the windings 1 and 2 at this time is also recorded to provide a known resistance at a known temperature for the initial conditions in the previously noted equation.

The autotransformer 8 is also separately connected in the Wheatstone bridge circuit 15. A second contact 32 associated with blade 10 of the double pole, triple throw switch 9 is connected to one terminal of the bridge circuit and a second contact 33 associated with blade 12 of switch 9 is connected to the adjacent terminal. When the blades 10 and 12 are in engagement with their associated contacts and switches 18 and 19a are in a corresponding open position, the autotransformer is connected in circuit as the unknown resistance.

As described above, the initial resistance of the windings 1 and 2 is found, the total resistance of windings 1 and 2 and the autotransformer is found, and the resistance of the autotransformer is found. By deducting the resistance of the autotransformer from the total resistance, the second or final resistance of the motor windings 1 and 2 is found. Therefore, knowing the initial and final resistances and the initial temperature, the final temperature is calculated from the previously noted equation:

$$T_2 = \frac{R_2}{R_1}(K + t_1) - K$$

The reciprocal of the constant of the coefficient of resistance "K" in the above equation is equal to 234.5 for copper. For aluminum, the coefficient "K" is sufficiently close to that of copper to allow the use of 234.5. Aluminum and copper cover practically all presently made field windings. Any other conductor can be brought within the above formula by suitable adjustment of the coefficient "K."

The invention provides a practical and accurate method for measuring the resistance of a motor field winding while the motor is in operation.

Various modes of carrying out the invention are contemplated as within the scope of the following claims particularly pointing out and distinctly claiming the subject matter which is regarded as the invention.

I claim:
1. The method of determining the resistance and temperature of a field winding of a dual voltage center tapped motor under operating conditions, which comprises determining the resistance and temperature of the field winding when the motor is deenergized, bringing the motor into operation, connecting a balancing winding having a known resistance in parallel with the field winding, locating the point on the coil having a potential equal to the center tapped potential of the field winding, measuring the resistance between the center tapped point on the field winding and the equal potential point of said balancing winding, resolving the resistance of the field winding from the last measurement and solving the equation

$$T_2 = \frac{R_2}{R_1}(K + t_1) - K$$

where $T_2$ and $t_1$ is equal to the final and initial temperatures, respectively, and $R_2$ and $R_1$ is equal to the final and initial resistance, respectively, and K is a constant of resistance for the particular metal of the field winding.

2. The method of determining the resistance and temperature of a field winding under operating conditions of a motor where the field winding can be tapped at an intermediate point, which comprises determining the resistance of the field winding at a known temperature and with the motor at a standstill, operating the motor, determining the total direct current resistance of the field winding in parallel with a known resistance balancing winding with a direct current source connected across intermediate equal potential points of the field winding and the balancing winding while the motor is operating, resolving the resistance of the field winding from the total resistance and the known resistance of the balancing winding, and determining the final temperature of the field winding from the equation:

$$T_2 = \frac{R_2}{R_1}(K + t_1) - K$$

where $T_2$ and $R_2$ is the final temperature and resistance, respectively, and $t_1$ and $R_1$ is the initial temperature and resistance, respectively, and K is a constant of resistance for the metal forming the field winding.

3. The method of determining the resistance of a motor field winding while the motor is operating where the field winding is a dual voltage having a center tap to provide a pair of identical coils in series connection, which comprises measuring the resistance of the deenergized field winding after the winding has set at room temperature to have the winding at room temperature and thereby obtain the winding resistance at a known winding temperature, determining the resistance of the field winding under operating conditions by connecting two identical coils in series across the field winding and connecting a direct current bridge circuit across the center tap and the junction of the two coils to prevent the flow of alternating current in the bridge circuit, and mathematically resolving the final temperature from the initial temperature and resistance and the final resistance, said mathematical resolution being based on the relationship between resistance and temperature of an electrical conductor.

References Cited in the file of this patent
UNITED STATES PATENTS

| | | |
|---|---|---|
| 1,358,718 | Fortescue | Nov. 16, 1920 |
| 2,011,384 | Thal | Aug. 13, 1935 |
| 2,578,455 | Seely | Dec. 11, 1951 |